United States Patent [19]

Lesesne

[11] 4,241,458
[45] Dec. 30, 1980

[54] BUNTING FOR ATTACHMENT TO A SEAT

[76] Inventor: Mary Lesesne, 1010 Sherman Ave., Bronx, N.Y. 10456

[21] Appl. No.: 44,718

[22] Filed: Jun. 1, 1979

[51] Int. Cl.³ .......................................... A41B 13/06
[52] U.S. Cl. .................................................... 2/69.5
[58] Field of Search ...................... 2/69.5, 69, 83, 114; 280/801; 297/464, 254, 465, 255, 377, 467; 128/134

[56] References Cited

U.S. PATENT DOCUMENTS

| | | | |
|---|---|---|---|
| 1,811,821 | 6/1931 | Bloom | 2/69 |
| 2,227,751 | 1/1941 | Idelman | 2/69.5 |
| 2,554,325 | 5/1951 | Comyns | 128/134 |
| 3,409,325 | 11/1968 | Hamilton | 297/377 |
| 3,641,997 | 2/1972 | Posey | 2/69 |

*Primary Examiner*—Ronald Feldbaum
*Attorney, Agent, or Firm*—Quaintance, Murphy & Richardson

[57] ABSTRACT

A bunting for attachment to a seat, which seat may be used with a stroller or other vehicle, includes slits for receiving waist and crotch straps so that a child may be secured to the seat with the bunting either open or closed. The bunting includes a zipper fastening to close it over the front of the child and drawstrings at both the bottom and top. The combination of these various features interact to provide the bunting with flexibility so that it may be adjusted to accommodate many situations and weather conditions.

11 Claims, 3 Drawing Figures

BUNTING FOR ATTACHMENT TO A SEAT

BACKGROUND OF THE INVENTION

1. Field of the Invention

This invention relates to buntings or children's blankets, and more particularly, this invention relates to buntings for use with seats such as the seats of strollers or other vehicles.

2. Prior Art and Other Considerations

Infants and young children are frequently placed in seats of strollers or carriages to be walked by their parents. Children also frequently ride on seats in automobiles, and on bicycles and are at times carried by seats strapped to their parent's backs. While children are being thus transported it is frequently necessary in cold or inclement weather to wrap the children in blankets or buntings prior to their outing.

To date there has been no convenient device for retaining a bunting in a seat so that the bunting remains in the seat after the child is removed or so that the bunting may be opened without unstrapping the child. Generally, the child is wrapped in the bunting and placed in the seat and then straps on the seat are fastened around the bunting to hold the child in place. When the straps are fastened it is difficult to comfortably hold the child in the seat because there is no convenient provision for the crotch strap of the seat so that the child is held in place by only a strap around its waist. At times, parents fail to strap the baby in place at all so that the baby can come tumbling out of the seat.

U.S. Pat. No. 2,707,988 discloses an "Infant Sack for Strollers and the Like" in which a sack has a pocket for holding the sack on the stroller structure. This patent does not disclose a bunting or blanket which could be conveniently employed with a stroller chair or modern design which has waist and crotch straps.

U.S. Pat. No. 3,962,738 discloses a stroller blanket, but in this patent the blanket has no structure for conveniently accommodating the straps for holding the blanket within the stroller after the baby is removed.

In view of the aforementioned considerations, there is a need for a bunting which can be conveniently used with seats for strollers or the like, which seats have a waist strap and crotch strap.

SUMMARY OF THE INVENTION

It is an object of the instant invention to provide a new and improved bunting which is conveniently usable with child seats having waist and crotch straps.

In view of this object, and other objects, the instant invention contemplates a bunting comprising a blanket having a first pair of spaced slots therein for receiving the waist straps of a seat and an additional slot therein for receiving the crotch strap of the seat. The blanket has progressive fastening means along opposed edges thereof and preferably has drawstrings at both the top and bottom.

DESCRIPTION OF THE PREFERRED EMBODIMENT

Figure 1:
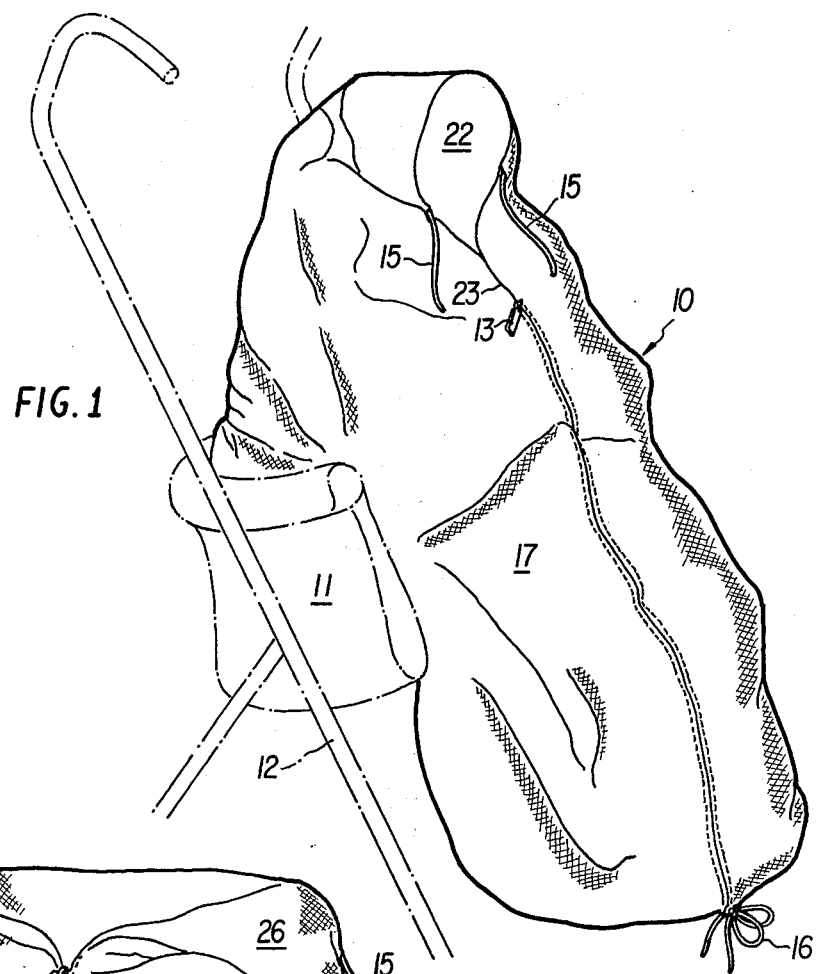
FIG. 1 is a perspective view of the bunting in accordance with the instant invention showing the bunting in combination with the seat of a stroller and zipped part way up to form a hood.
Figure 3:
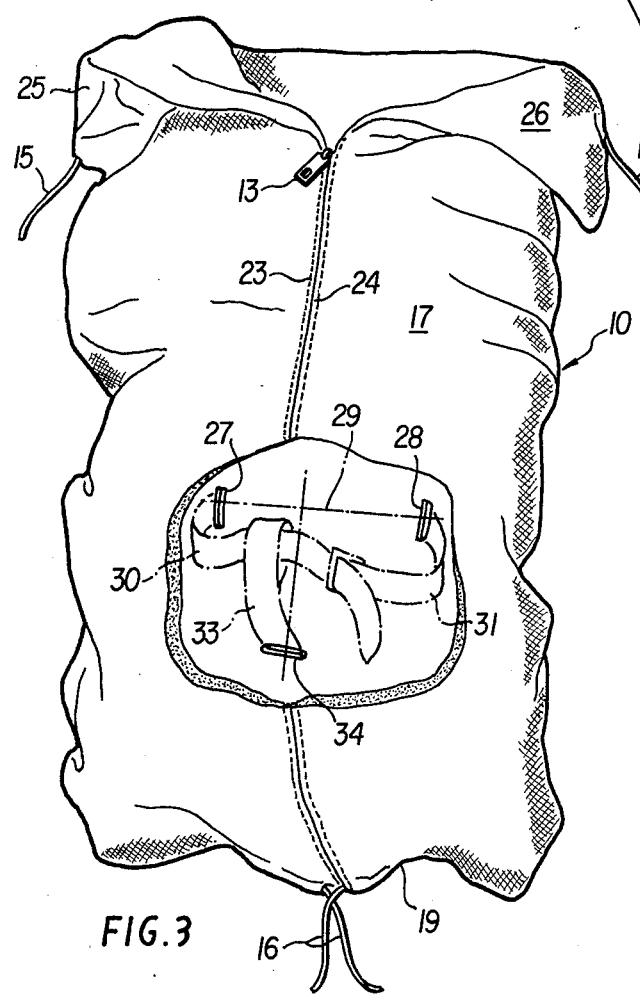
FIG. 3 is a perspective view of the bunting of FIG. 1 with the top open and partially cut away to show slits for seat straps on the inside, which straps are shown in phantom.

Referring now to FIG. 1 there is shown a bunting 10, according to the instant invention, in combination with a seat 11 of a stroller 12. The seat 11 and stroller 12 are shown by phantom lines and the seat 11 includes waist and crotch straps as shown in FIG. 3. The bunting has a zipper fastener 13 for progressively closing the bunting up to enclose a child therein and has top and bottom drawstrings 15 and 16, respectively, for closing the top and bottom of the bunting.

Figure 2:
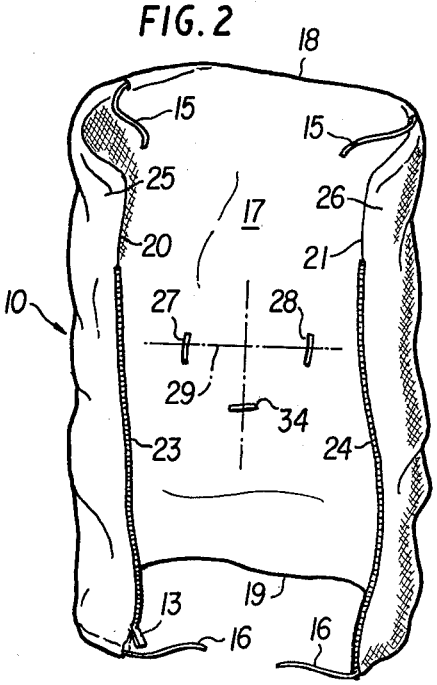
FIG. 2 is a perspective view showing the bunting unzipped.

Referring now to FIG. 2, it is seen that the bunting 10 consists of blanket 17 having a top edge 18, a bottom edge 19 and left and right side edges 20 and 21, respectively. The zipper 13 progressively connects the left and right edges 20 and 21 together to form a tube as seen in FIG. 3, while the drawstring 15 can progressively shut the lower end of the blanket by gathering the bottom edge 19 together. The zipper 13 has tracks 23 and 24 which extend from the bottom edge 19 of the blanket 17 and terminate before reaching the top edge 18 to form flap portions 25 and 26 which have soft edges since the tracks stop before reaching them. The flaps 25 and 26 may be folded in or out in order to decrease or increase the child's exposure.

Since it is often necessary to protect the child's head, the top edge 18 of the blanket 17 can be folded over to form a hood 22, the opening of which may be adjusted by tightening or loosening the drawstring 15. By so arranging the drawstrings 15 and 16 and the zipper tracks 23 and 24 a comfortable, flexible and inexpensive bunting is provided which is relatively easy to manufacture. Moreover, since the drawstrings 15 and 16 and zipper tracks 23 and 24 are on the edges 18, 19, 20 and 21 of the blanket 17, the blanket is readily reversible so that, if desired, one material can be used on one side of the blanket while another material is used on the other.

The blanket 17 has a pair of slits 27 and 28 disposed along an imaginary line 29 through which waist straps 30 and 31 from the seat 11 are passed. A crotch strap 33 from the seat 11 projects through a slit 34 which is spaced downward of the line 29 between the slits 27 and 28. In order to fasten the baby within the seat 11 with the blanket 17 open, the straps are connected by sliding strap 31 through a loop 37 in crotch strap 33 and then buckling strap 31 to strap 32. The blanket 17 can then be closed by the desired amount about the baby as discussed above by progressively closing the zipper 13. When the baby is removed from the blanket 17, the blanket can be left in the seat 11 with the straps 30, 31, and 33 open. All one need do is unzip the blanket and lift the baby out. If desired, the blanket can be removed from the stroller 12 with the baby in it after the waist straps 30 and 31 are unbuckled and the crotch strap 33 removed.

The foregoing example is merely illustrative of the invention which is to be limited by the following claims.

When used as crib cover, drawstrings on lower edge 19 serve as anchors to crib sides.

What is claimed is:

1. A bunting for protecting a small child against inclement weather, comprising:

blanket means for wrapping about the child;

a pair of first slots through the blanket means for passage of waist straps of a seat;

a second slot positioned between the first slots and spaced from the line including the first slots for receiving a crotch strap therethrough wherein the crotch strap cooperates with the waist straps to secure the child both within the seat and against the blanket means before the blanket means is wrapped about the child.

2. The bunting of claim 1 wherein the blanket means is generally rectangular and includes first and second edges with progressive fastening means therealong, which fastening means is progressively fastened to join the edges of various progressive positions for progressively closing the blanket means about the child.

3. The bunting of claim 2 further comprising a first drawstring positioned at the lower edge of the blanket means for adjustably closing and opening the bottom of the blanket means.

4. The bunting of claim 3 further comprising a second drawstring positioned at the top of the blanket means for selectively closing the top of the blanket means to form a hood for the child's head when the fastening means is not fastened all the way to the top edge of the blanket means.

5. The bunting of claim 1, 2, 3, or 4 wherein the blanket means has a first surface of one material and a second surface of another material to render the blanket means reversible.

6. In combination, a bunting and child seat comprising:

waist straps attached to the seat and a crotch strap attached to the seat;

a blanket forming the bunting wherein the blanket has a pair of slits therethrough positioned generally along a line through which the waist straps are passed, and wherein the blanket further includes a third slit disposed between the first and second slits and spaced from the line for receiving a crotch strap therethrough, whereby the child is retained within the seat and within the blanket when the blanket is closed about the child.

7. The bunting of claim 6 wherein the blanket has first and second edges which include progressive fastening means for enclosing selected portions of the child.

8. The apparatus of claim 7 wherein the blanket further includes a drawstring at the bottom of the blanket to open and close adjustably the bottom of the blanket.

9. The bunting of claim 8 wherein the blanket includes a top string disposed at the top edge of the blanket for closing the top edge of the blanket to form a hood.

10. The combination of claim 9 wherein the blanket has a first material on one side and second material on the other side to render the blanket reversible.

11. The combination of claim 6 further including vehicular structure connected to the seat to form a stroller.

* * * * *